(12) United States Patent
Park et al.

(10) Patent No.: US 9,866,273 B2
(45) Date of Patent: Jan. 9, 2018

(54) APPARATUS AND METHOD FOR ACCESSING NETWORK

(71) Applicant: KT CORPORATION, Gyeonggi-do (KR)

(72) Inventors: No Wook Park, Gyeonggi-do (KR); Hyung Jin Park, Seoul (KR); In Taek Jeong, Daejeon (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 15/100,387

(22) PCT Filed: May 19, 2014

(86) PCT No.: PCT/KR2014/004461
§ 371 (c)(1),
(2) Date: May 31, 2016

(87) PCT Pub. No.: WO2015/102168
PCT Pub. Date: Jul. 9, 2015

(65) Prior Publication Data
US 2016/0308581 A1 Oct. 20, 2016

(30) Foreign Application Priority Data

Dec. 30, 2013 (KR) .................. 10-2013-0167778

(51) Int. Cl.
*H04B 3/52* (2006.01)
*H04B 3/32* (2006.01)
(Continued)

(52) U.S. Cl.
CPC ................ *H04B 3/52* (2013.01); *H04B 3/32* (2013.01); *H04B 3/487* (2015.01); *H04L 12/46* (2013.01);
(Continued)

(58) Field of Classification Search
CPC combination set(s) only.
See application file for complete search history.

(56) References Cited

U.S. PATENT DOCUMENTS

| 5,643,704 A | 7/1997 | Tamura et al. |
| 8,107,937 B2 | 1/2012 | Jokinen et al. |

(Continued)

FOREIGN PATENT DOCUMENTS

| EP | 1086548 B1 | 8/2012 |
| KR | 10-2010-0016092 A | 2/2010 |

(Continued)

OTHER PUBLICATIONS

Vladimir Oksman et al., "G.hn: The New ITU-T Home Networking Standard", IEEE Communications Magazine, Oct. 2009, pp. 138-145.

(Continued)

*Primary Examiner* — David Payne
*Assistant Examiner* — Omar S Ismail
(74) *Attorney, Agent, or Firm* — IP Legal Services, LLC (57) ABSTRACT

Disclosed are a network access device and method for improving data transmission efficiency without replacement of a home network or additional pairing. A network access device is connected to a control server through an external wideband network and connected to at least one end point through at least one cable. Such a network access devices includes an interface module configured to couple with the network, at least one domain master connected to the at least one end point, an adaptation module configured to convert G.hn signals to Ethernet signals between the domain master and the interface module, and a processor configured to control the interface module and the at least one domain master. The processor communicates with the control server (Continued)

through an external wideband network to check status of the home network and provisions the home network in real time.

11 Claims, 5 Drawing Sheets

(51) Int. Cl.
*H04L 12/46* (2006.01)
*H04B 3/487* (2015.01)
*H04Q 11/00* (2006.01)
*H04L 25/02* (2006.01)
*H04M 11/06* (2006.01)

(52) U.S. Cl.
CPC ...... *H04L 12/4625* (2013.01); *H04L 25/0202* (2013.01); *H04M 11/062* (2013.01); *H04Q 11/0067* (2013.01)

(56) References Cited

U.S. PATENT DOCUMENTS

| | | | |
|---|---|---|---|
| 2008/0159744 A1 | 7/2008 | Soto et al. | |
| 2008/0225687 A1 | 9/2008 | Oksman | |
| 2008/0279105 A1 | 11/2008 | Absillis et al. | |
| 2010/0150556 A1 | 6/2010 | Soto et al. | |
| 2011/0268258 A1* | 11/2011 | Alloin | H04M 3/2209 379/32.04 |
| 2012/0148249 A1* | 6/2012 | Hahm | H04J 14/0232 398/66 |
| 2012/0246331 A1* | 9/2012 | Heller | H04L 12/2832 709/230 |
| 2013/0077638 A1* | 3/2013 | Kim | H04B 3/542 370/462 |
| 2013/0215951 A1* | 8/2013 | Nuzman | H04B 3/32 375/227 |
| 2014/0307572 A1* | 10/2014 | Mungall | H04J 3/025 370/252 |
| 2014/0314412 A1 | 10/2014 | Soto et al. | |
| 2014/0355617 A1* | 12/2014 | Brown | H04L 12/28 370/401 |
| 2015/0078756 A1 | 3/2015 | Soto et al. | |

FOREIGN PATENT DOCUMENTS

| | | |
|---|---|---|
| KR | 10-2012-0063985 A | 6/2012 |
| KR | 10-2012-0068537 A | 6/2012 |
| KR | 10-2013-0081409 A | 7/2013 |

OTHER PUBLICATIONS

ITU-T G.9960, "Series G: Transmission Systems and Media, Digital Systems and Networks; Access networks—In premises networks; Unified high-speed wireline-based home networking transceivers—System architecture and physical layer specification", Dec. 2011.

* cited by examiner

APPARATUS AND METHOD FOR ACCESSING NETWORK

CROSS REFERENCE TO RELATED APPLICATIONS

This application is a National Stage Patent Application of PCT International Patent Application No. PCT/KR2014/004461 (filed on May 19, 2014) under 35 U.S.C. §371, which claims priority to Korean Patent Application No. 10-2013-0167778 (filed on Dec. 30, 2013), the teachings of which are incorporated herein in their entireties by reference.

BACKGROUND

1. Field

The following description relates to a network access device and a network access method.

2. Description of Related Art

Digital subscriber line (DSL) is used to provide Internet services by connecting a home network to an external network. Among DSL technologies, very-high-bit-rate digital subscriber line (VDSL) enables transmitting data at a rate exceeding about 100 Mbit/s simultaneously in both an uplink and a downlink using frequencies of 30 MHz. However, in order to archive such a high data transmission rate exceeding about 100 Mbps with the VDSL, it might require replacing a typical system with a system using VDSL bonding techniques. Such VDSL bonding techniques require at least 2 pairs. Accordingly, there is difficulty to achieve data transmission rate exceeding about 200 Mbps without increasing the number of pairs. As another method, in order to provide a gigabit level data transmission service, a home network may be replaced with an optical fiber. However, such a method requires a high replacement cost.

A G.hn technology has been also introduced to provide wire-based gigabit home networks. The G.hn technology uses one pair of copper wires (for example, power wires, telephone wires, coaxial wires and the like) and determines the maximum available frequency band for each transmission medium to manage data traffic for each transmission medium. However, network access devices and methods are required to connect the home network to an external wideband network such as Ethernet in order to implement for G.hn-based home networking. In addition, network access devices and methods are required to manage the home network based on status of the home network in real time in order to improve data transmission efficiency.

KR Patent Publication No. 10-2012-0068537 discloses an optical network unit (ONU) device and a method for synchronizing the same in a cable network to connect with an external optical network. In particular, the KR patent publication discloses an optical network device in a cable network by implementing an edge-quadrature amplitude modulation in the optical network device, not in a head end, to facilitate application of fiber-deep and microcells. However, the KR patent publication cannot provide functions to monitor data transmission of the home network and increase its efficiency.

KR Patent Publication No. 10-2010-0016092 discloses GPON OAM using IEEE 802.1 ag methodology. In the disclosed technology, one flow point among flow points such as OLT or ONT generates a text message and another flow point receives information of network connection status based thereon. However, the disclosed technology cannot provision dynamically even though it can check the network connection status.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, a network access device and a network access method improve efficiency of network services without replacing cables of home networks.

In accordance with another embodiment, a network access device a system operating the same reduces interference when home networks are formed with a bundle cable.

In accordance with still another embodiment, a network access device and a network access method expand network management functions to home sections.

According to at least one aspect, a network access device is connected to a control server through network and connected to at least one end point through at least one cable. The device includes an interface module, at least one domain master, an adaptation module, and a processor. The at least one domain master may be configured to cooperate with the network. The at least one domain master may be connected to the at least one end point. The adaptation module may be located between the domain master and the interface module and configured to convert G.hn signals to Ethernet signals. The processor may be configured to control the interface module and the at least one domain master. The processor may control the domain master to check channel status and receive the result to report to the control server. The control server may generate information for provisioning based on the channel status and transmit the result to the processor. The processor may perform channel provisioning between the domain master and the end point based on the information.

The network may include an optical line termination, and the interface module may perform uplink interface for the optical line termination.

The adaptation module may include at least one adaptation buffer and a scheduler. The at least one adaptation buffer may be connected to each domain master. The scheduler may be configured to be connected between the interface module and the at least one adaptation buffer. At least one pair of the at least one end point and the at least one domain master may be connected through a copper-wired cable.

According to another aspect, a network access method may be performed by a network access device connected to a control server through network and connected to at least one end point through a cable, wherein the network access device comprises a processor and at least one domain master connected to each end point. The method may include pairing between the domain master and the end point and registering the result, reporting the registration to the processor by the domain master, reporting the registration to the control server through the network by the processor, receiving a channel estimation request from the control server through the network and transmitting the received channel estimation request to the domain master by the processor, performing channel estimation between the domain master and the end point, and reporting the channel estimation from the domain master to the processor and transmitting the reported channel estimation to the control server through the network by the processor, wherein the control server estimates resource provisioning based on the channel estimation and transmits the result to the processor, and the processor provisions the domain master and the end point based on the resource provisioning.

The network may be a wideband network. The domain master and the end point may be connected through a bundle cable.

The control server may request channel re-estimation when a signal-to-noise ratio for channel estimation is greater than a threshold value and estimate resource provisioning based on the re-received channel estimation.

In accordance with at least one embodiment, the network access device may operate the domain master using the G.hn technology to perform channel estimation for a subscriber network (e.g., a home network) and transfer the channel estimation result to the control server through an external network. The control server may provision the home network through the processor and the domain master in the network access device based thereon. Therefore, the network access device according to an example may improve quality of the home network without replacing legacy wires, for example, such as telephone wires, power wires or the like into optical fibers. Furthermore, the network access device may improve quality of the home network without increasing the number of pairings in accordance with at least one embodiment.

Other features and aspects will be apparent from the following detailed description, the drawings, and the claims.

Throughout the drawings and the detailed description, unless otherwise described or provided, the same drawing reference numerals refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure is thorough, complete, and conveys the full scope of the disclosure to one of ordinary skill in the art.

It will be understood that, when it is described that a method includes series of steps, a sequence of the steps is not a sequence in which the steps should be performed in the sequence, an arbitrary technical step may be omitted and/or another arbitrary step, which is not disclosed herein, may be added to the method.

In descriptions of components of the disclosure, the same reference numeral may be assigned to the same component in different drawings, and alphabet sub-numeral may be assigned to the same reference numeral for the same component, for example, such as 118a, 118b, 118c, 118d, 118e, 118f, . . . for a plurality of domain masters. The reference numeral for the same component may be the reference numeral which represents the same component, for example, 118 for the domain master.

Figure 1:
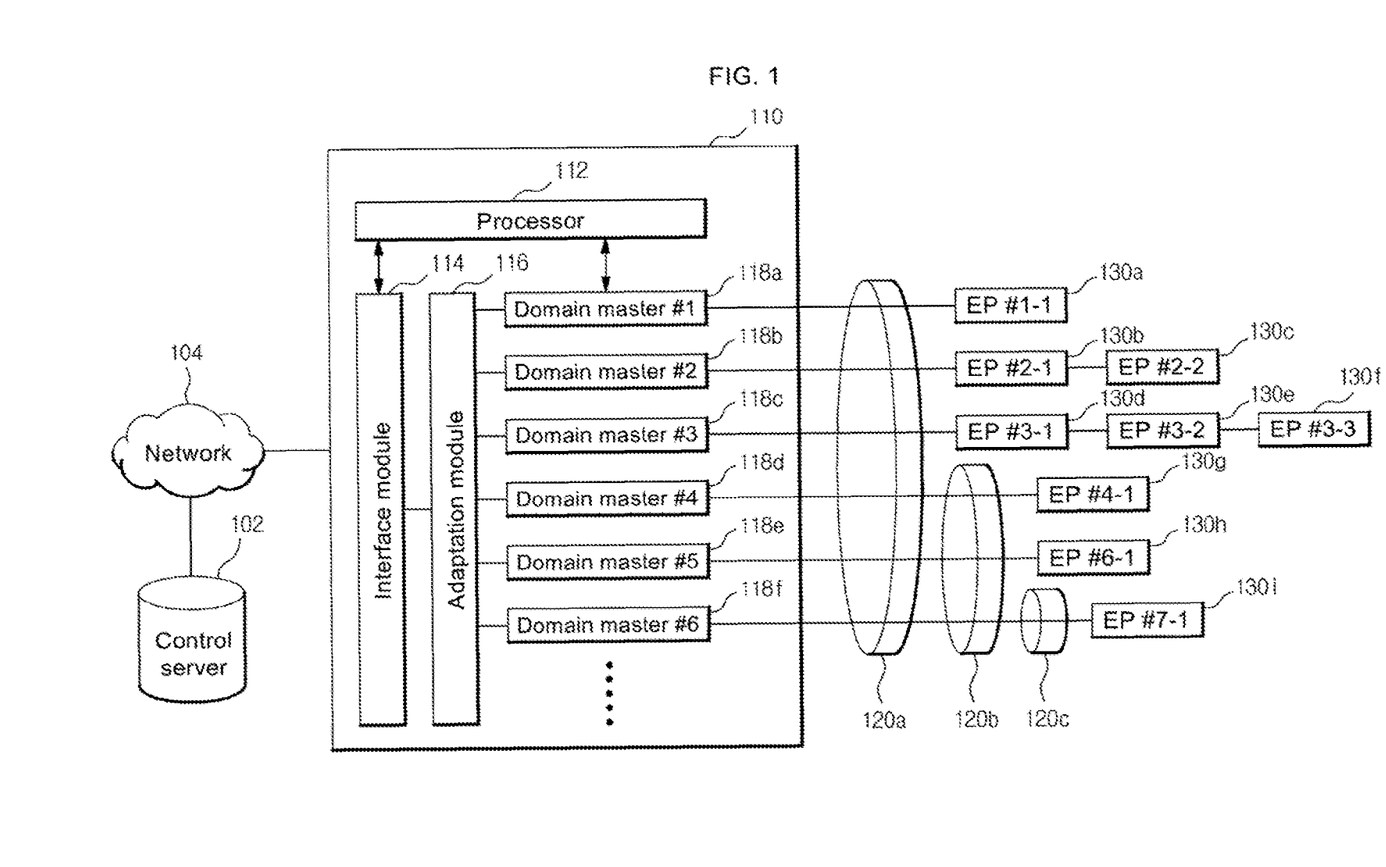
FIG. 1 is a schematic diagram illustrating an Internet service providing system implemented by using a network access device according to an embodiment.

FIG. 1 is a schematic diagram illustrating an Internet service providing system implemented by using a network access device in accordance with at least one embodiment.

Referring to FIG. 1, an uplink of a network access device 110 may be connected with a control server 102 through a network 104. A downlink of the network access device 110 may be connected with at least one end point 130a, 130b, 130d, 130g, 130h, and 130i through at least one cable 120a, 120b, and 120c. The network 104 may be a wideband network, for example, such as FTTx (Fiber To The x) including FTTH (Fiber To The Home) and include an optical line termination (OLT) at the end. The cable of the downlink side 120a, 120b, or 120c may be a bundle cable.

The network access device 110 may include a processor 112, an interface module 114, an adaptation module 116, and at least one of domain masters 118a, 118b, 118c, 118d, 118e, and 118f The interface module 114 may perform operations for internetworking with an optical line termination device of the network of the unlink side. Each of the domain masters 118a, 118b, 118c, 118d, 118e, and 118f may manage each of the subscriber's end points 130a to 130i which are connected to the downlink side, monitor line status of the downlink side, and generate G.hn signals to transmit to a transmission medium.

The adaptation module 116 may be located between the domain master 118 and the interface module 114 to convert from the G.hn signals of downlink side to Ethernet signals of the uplink side or from Ethernet signals of the uplink side to G.hn signals of the downlink side. The processor 112 may control operations of modules in the network access device 110. The processor 112 may inform normal data receiving from the network of the uplink side to the control server 102 and receive network control-related information, for example, such as priority, QoS, traffic of the data. The processor 112 may also monitor line status of the downlink side through the domain master 118 to transmit the result to the control server 102.

The control server 102 may estimate network parameters, for example, such as G.hn network parameters for provisioning lines of the downlink side base on the link status information of the downlink side transmitted from the network access device. Then, the control server 102 may transmit the result to the network access device. The processor 112 may provision the network in the downlink side which is a subscriber's line based on the network parameters received from the control server 102. Communication between the control server 102 and the processor 112 may be performed based on a reliable protocol, for example, such as an OpenFlow protocol for provisioning the network in the downlink side.

Figure 2:
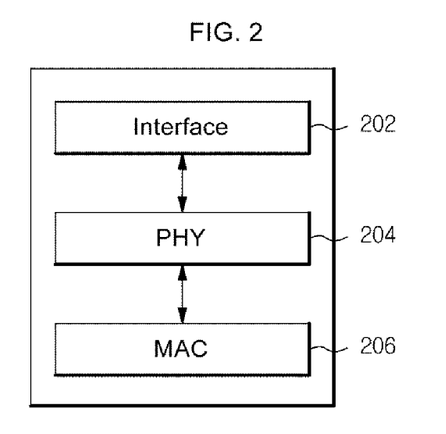
FIG. 2 is a schematic diagram illustrating an interface module in accordance with at least one embodiment.

FIG. 2 is a schematic diagram illustrating an interface module 114 in accordance with at least one embodiment. The interface module 114 may include an interface 202, a physical layer (PHY, 204), a MAC layer (MAC, 206).

Figure 3:
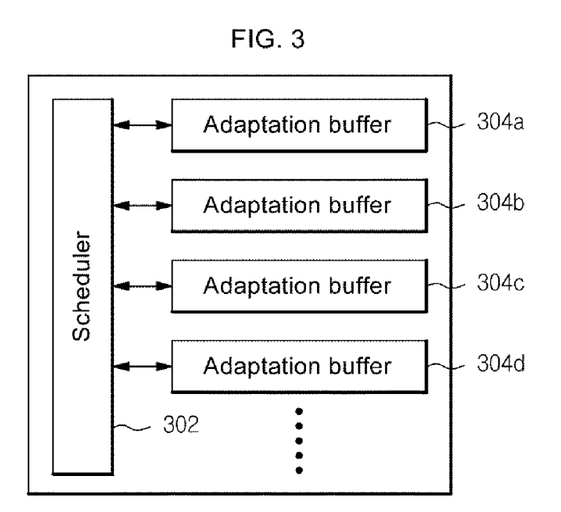
FIG. 3 is a schematic diagram illustrating an adaptation module in accordance with at least one embodiment.

FIG. 3 is a schematic diagram illustrating an adaptation module 116 in accordance with at least one embodiment. The adaptation module 116 may include at least one of adaptation buffers 304a, 304b, 304c, and 304d (collectively, "304") and a scheduler 302. The scheduler 302 may perform scheduling based on properties of data to be transmitted to the uplink side and data to be received from the uplink side. The scheduler 302 may determine whether the data to be transmitted/received has burst features or not for more efficient data transmission. The adaptation buffer 304 may perform conversion between Ethernet signals and G.hn signals and buffering.

Figure 4:
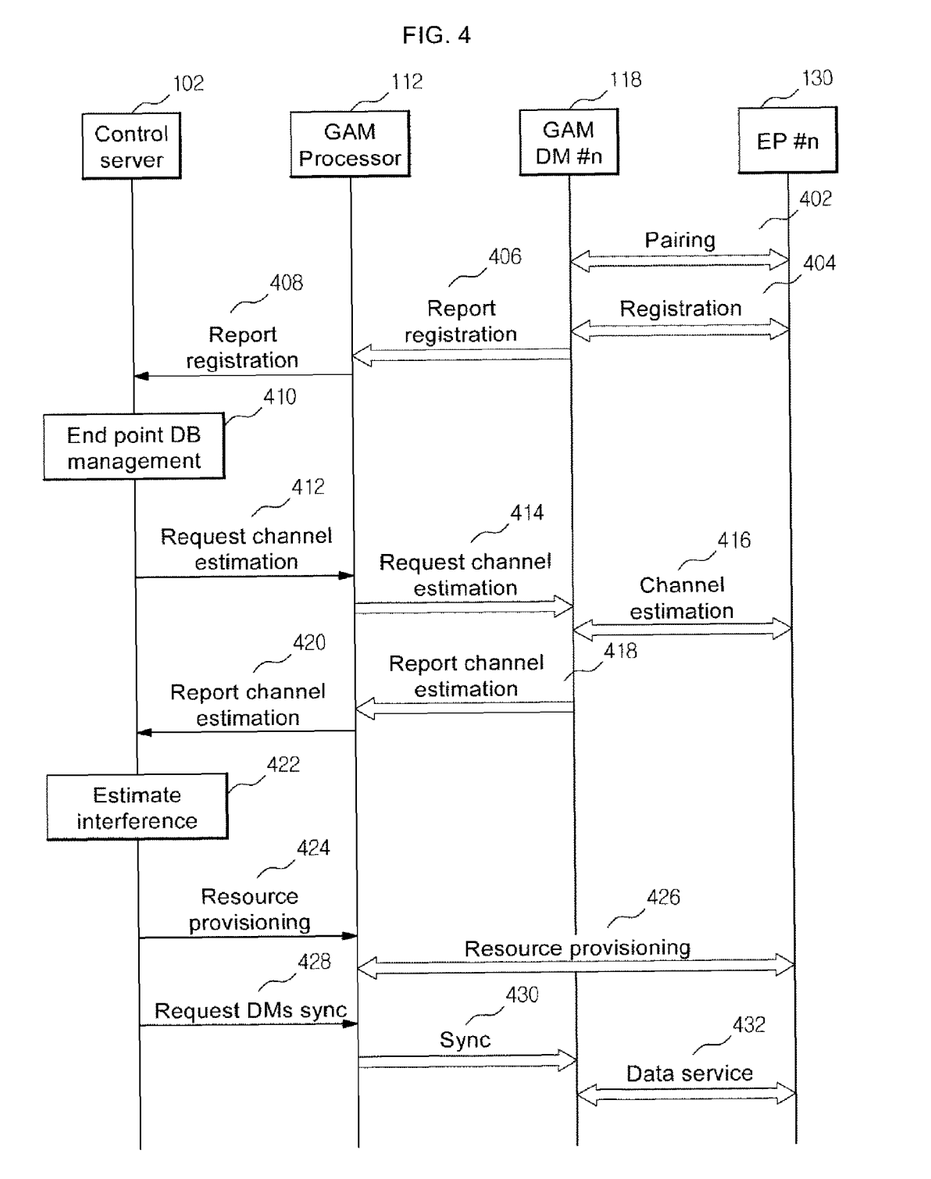
FIG. 4 is a flowchart illustrating a method for resources provisioning of a subscriber's network through communication in accordance with at least one embodiment.

FIG. 4 is a flow chart illustrating a network access method, particularly a method for resources provisioning of the subscriber's network through communication in accordance with at least one embodiment.

One of the domain masters 118 may be paired with one of the end points 130 over copper lines, which are already built to provide DSL or ADSL-based network services, to provide more efficient communications in step 402. When a plurality of domain masters 118 and a plurality of end points 130 are connected with a bundle cable, a pairing process may be performed to prevent pairing of one domain master 118 with an improper end point which is adjacent to a corresponding end point, instead of the corresponding end point, due to interference in the bundle cable.

When the end point 130 is connected to the corresponding port of the domain master 118 through the pairing process, the domain master may register pairing information using a periodic map message in step 404. The domain master may register which end point is connected thereto. The registered pairing information may be reported to the processor 112 through the domain master 118 in step 406. The processor 112 may report registration of the pairing information to the control server 102 in step 408. The control server 102 may manage an end point database based on the received pairing information. The control server 102 may request channel estimation through the network based on a predetermined condition periodically or by event trigger in step 412. The processor 112 may receive a channel estimation request from the control server 102 and transfer it to the domain master 118 in step 414. The channel estimation may be performed between the domain master 118 and the end point 130 in step 416. Channel estimation result may be reported from the domain master 118 to the processor 112 in step 418. The processor 112 may transmit the channel estimation result to the control server 102 through the network 104 in step 420. The control server 102 may estimate interference between the domain masters based on the channel estimation result to generate network parameters for provisioning the network in the downlink side in step 422. Here, the control server 102 may generate network parameters for provisioning the network not to be impacted or to minimize the impact by the interference between the domain masters. This may be performed by PSD power control, bit loading allocation, tone spacing or the like.

The generated network parameters and the provisioning request may be transferred from the control server 102 to the processor 112 in step 424. A provisioning process for network resources of the downlink side may be performed by the processor 112 in step 426.

The control server 102 may transmit a domain master synchronization request (e.g., DM sync request) to the processor 112 in step 428. The processor 112 may perform synchronization for the domain masters 118 in step 430. A data service between the domain master 118 and the end point 130 may be provided in step 440.

Figure 5:
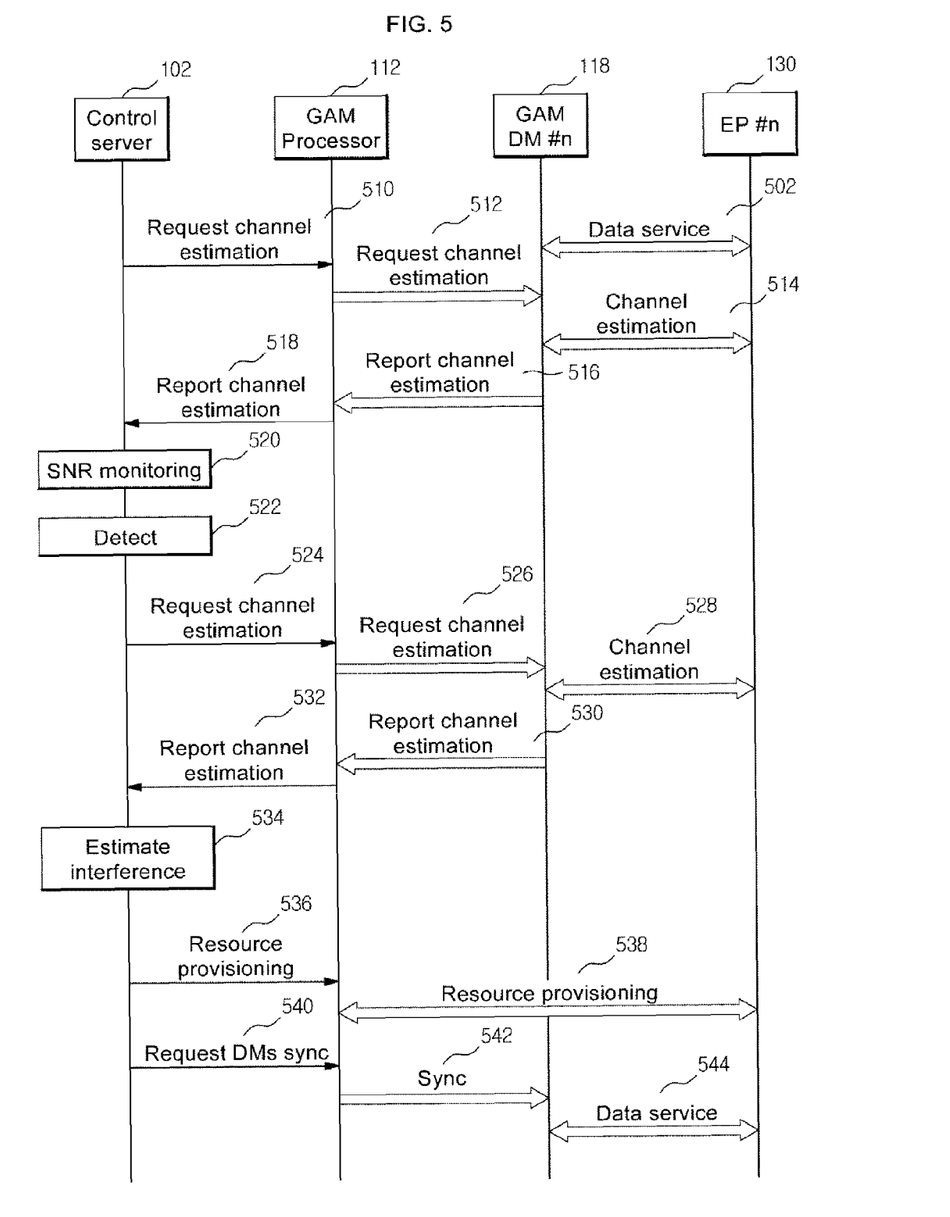
FIG. 5 is a flowchart illustrating a method for resources provisioning of the subscriber's network using a network access device during data-in service in accordance with at least one embodiment.

FIG. 5 is a flowchart illustrating a method for resources provisioning of a subscriber's network using a network access device during data-in service in accordance with at least one embodiment.

Referring to FIG. 5, a data service between the domain master 118 and the end point 130 may be provided in step 502. The control server 102 may transmit a channel estimation request to the processor 112 during providing the data service in step 510. The processor 112 may transmit the received channel estimation request to the domain master 118 in step 512. Channel estimation between the domain master 118 and the end point 130 may be performed in step 514. Channel estimation result may be reported to the processor 112 in step 516. The processor 112 may transmit it to the control server 102 in step 518.

The control server 102 may perform signal-to-noise ratio monitoring (SNR monitoring) in step 520 to determine whether resource provisioning is needed or not in step 522. For example, the control server 102 may determine whether a threshold value predetermined by an operator is exceeded or not or whether there is a sudden SNR falling or not.

When it is determined as that resource provisioning is needed, the control server 102 may transmit a channel re-estimation request to the domain master 118 through the processor 112 in step 524 and step 526. Channel estimation between the domain master 118 and the end point 130 may be performed again in step 528. Channel estimation result may be reported to the processor 112 in step 530 and the processor 112 may transmit it to the control server 102 through the network 104 in step 532.

The control server 102 may estimate interference between the domain masters based on the channel re-estimation result to generate parameters for resource provisioning in step 534. The network parameters related to the resource provisioning request may be transmitted to the processor 112 through the network 104 in step 536. The processor 112 may perform subscriber's network resource provisioning based thereon in step 538. The control server 102 may transmit a domain master synchronization request (e.g., DM sync request) to the processor 112 in step 540. The processor 112 may perform synchronization for the domain masters 118 in step 542. A data service between the domain master 118 and the end point 130 may be provided in step 544.

Figure 6:
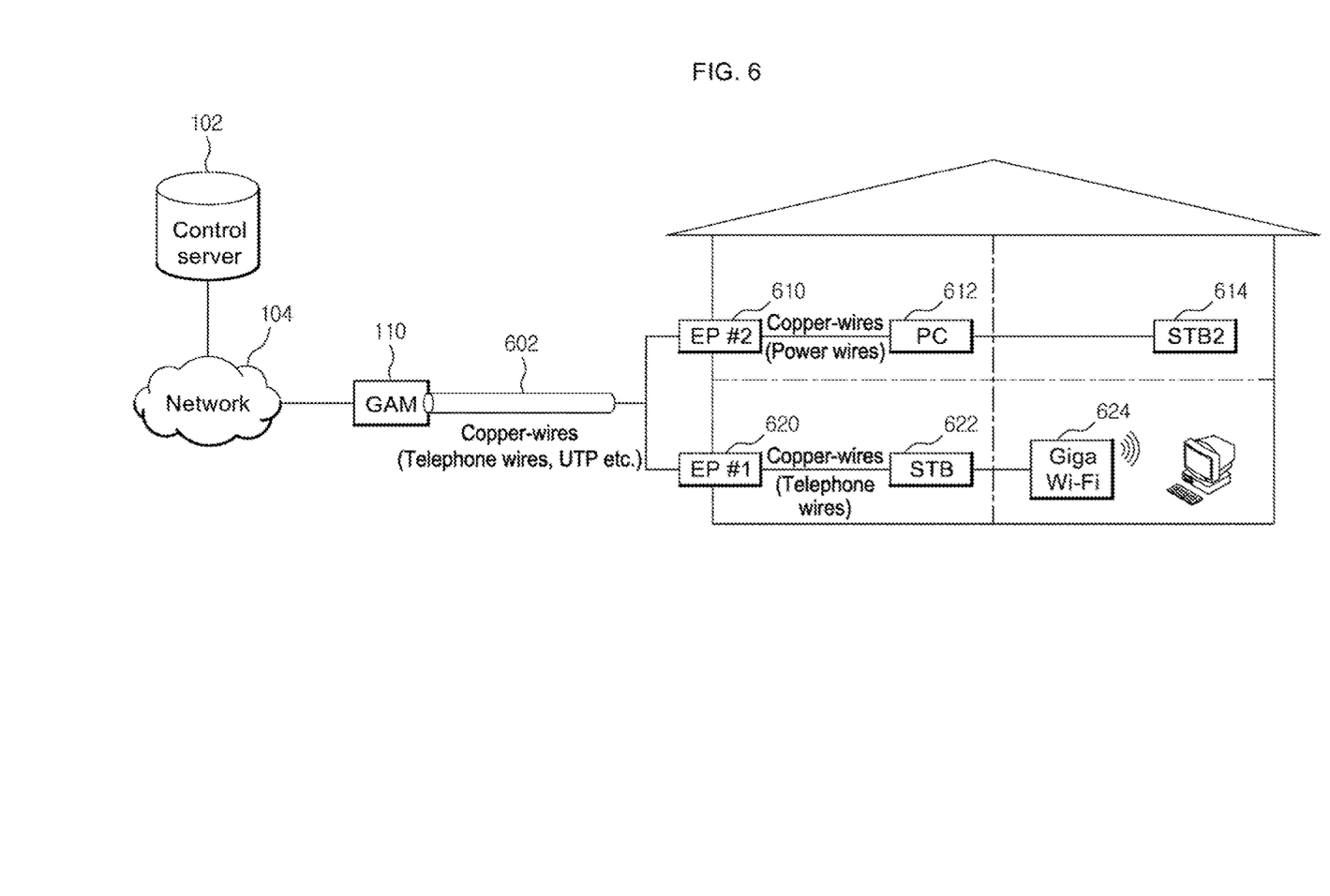
FIG. 6 is a schematic diagram illustrating a network service system including a network access device in accordance with at least one embodiment.

FIG. 6 is a schematic diagram illustrating a network service system including a network access device in accordance with at least one embodiment.

Referring to FIG. 6, a network access device (e.g., GAM: G.hn access multiplexer) 110 and end points 610 and 620 may be connected through a copper-wired cable. Examples of the copper-wired cable may include telephone wires, UTP or the like. The end point 610 in FIG. 6 may be connected to a personal computer 612 through a power line and the PC 612 may be connected to a set-top box 614. The end point 620 may be connected to a set-top box 622 which is connected to a gigabit Wi-Fi terminal 624.

As shown FIG. 6, in accordance with at least one embodiment, a network access device and a network access method may control the control server 102, which is connected to an external wideband network, to generate network parameter for provisioning the home network and the processor 112 in the network access device to perform the provisioning. Accordingly, the home network may be managed dynamically.

What is claimed is:

1. A network access device which is connected to a control server through a network and connected to at least one end point through at least one cable, the network access device comprising:
    an interface module configured to cooperate with the network;
    at least one domain master configured to be connected to the at least one end point;
    an adaptation module located between the domain master and the interface module and configured to convert G.hn signals to Ethernet signals; and
    a processor configured to control the interface module and the at least one domain master,
    wherein the network comprises an optical line termination, and the interface module performs uplink interface for the optical line termination, and
    wherein the adaptation module comprises at least one adaptation buffer configured to be connected to each domain master and a scheduler configured to be connected between the interface module and the at least one adaptation buffer.

2. The network access device of claim 1, wherein the domain master and the end point are connected through a bundle cable.

3. The network access device of claim 1, wherein at least one pair of the at least one end point and the at least one domain master is connected through a copper-wired cable.

4. The network access device of claim 1, wherein the processor monitors wire interference generated by communication between the at least one domain master and the at least one end point and generates interference information to transmit to the control server.

5. The network access device of claim 4, wherein the processor receives a communication setting parameter value which is determined based on the interference information by the control server.

6. A network access method which is performed by a network access device connected to a control server through a network and connected to at least one end point through a cable, wherein the network access device comprises a processor and at least one domain master connected to each end point, the method comprising:
    pairing between the domain master and the end point, and registering the result;
    reporting the registration to the processor by the domain master;
    reporting the registration to the control server through the network by the processor;
    receiving a channel estimation request from the control server through the network to the processor and transmitting it to the domain master from the processor;
    performing channel estimation between the domain master and the end point; and
    reporting the channel estimation from the domain master to the processor and transmitting the reported channel estimation to the control server through the network by the processor,
    wherein the control server estimates resource provisioning based on the channel estimation and transmits the result to the processor, and the processor provisions the domain master and the end point based on the resource provisioning, and
    wherein the control server requests channel re-estimation when a signal-to-noise ratio for the channel estimation is greater than a threshold value and estimates resource provisioning based on the re-received channel estimation.

7. The network access method of claim 6, wherein the network is a wideband network.

8. The network access method of claim 6, wherein the channel estimation comprises interference information generated by the communication between the domain master and the end point.

9. The network access method of claim 6, wherein the domain master and the end point are connected through a bundle cable.

10. The network access method of claim 9, wherein the bundle cable connects each of a plurality of domain masters including the domain master with each of a plurality of end points including the end point in a one-to-one manner (1:1).

11. The network access method of claim 10, wherein a data transmission point and a data receiving point of each of the plurality of domain masters are controlled to be matched.

* * * * *